3,423,194
ALUMINUM SIMULTANEOUSLY IMPREGNATED WITH SALTS OF NICKEL, ALUMINUM AND METAL PROMOTER
Kenneth K. Kearby, Watchung, N.J., assignor to Esso Research and Engineering Company, a corporation of Delaware
No Drawing. Filed June 11, 1965, Ser. No. 463,324
U.S. Cl. 48—214                    6 Claims
Int. Cl. C10g 15/06; C10k 3/02; B01j 11/26

ABSTRACT OF THE DISCLOSURE

A catalyst prepared by simultaneously impregnating an alumina support with an aqueous solution of salts of nickel and aluminum, which are thermally decomposable to the oxides, drying and calcining the impregnated alumina and thereafter reducing the nickel oxides to nickel has been found to be effective in catalyzing reactions of hydrocarbons with steam.

---

This invention is concerned with a low nickel-content catalyst having high activity for hydrogen transfer reactions such as reactions of hydrocarbons with steam and carbon monoxide with steam carried out at moderate temperatures for production of Town Gas, production of hydrogen or for exhaust gas purification at temperatures in the range of 100° to 1500° F.

A low nickel-content (5 to 25 wt. percent Ni) catalyst of surprisingly high activity compared to the activity of catalysts having a much higher nickel content formed by ordinary impregnation methods or by more expensive coprecipitation techniques is obtained by simultaneous impregnation of an adsorptive alumina support with aqueous solutions of a nickel salt and an aluminum salt. Also, the support is preferably likewise impregnated with a decomposable water-soluble salt of a promoter such as a salt of barium. Suitable and preferred water-soluble salts that are decomposable to the metal oxides are nitrates and organic salts, e.g. acetates. The salts used for impregnation are convertible to oxides of the metals by calcination. The term impregnation is thus used to include the steps of deposition and decomposition.

Repeated impregnations may be made after the previously impregnated support material is dried, and can be made with the solution drained from the previous impregnation of the supported material. The catalyst consisting of the activated alumina support impregnated one or more times by the nickel and aluminum compounds simultaneously and by promoter is made to contain 5 to 25 wt. percent Ni and about 5 to 25 wt. percent of the added $Al_2O_3$.

The preferred activated or adsorptive alumina support material may be of the type known as gamma or eta alumina obtained by calcination of alumina hydrates at temperatures ranging up to about 1600° F. It will usually have a surface area in the range of 80 to 300 sq. meters per gram.

The improved low nickel-content catalysts are active for hydrogen transfer reactions of the following types:

$C_xH_y + H_2O \rightarrow H_2 + CO + CO_2 + CH_4$ ($C_xH_y = C_2$ to $C_{12}$ hydrocarbons)
$CH_4 + H_2O \rightarrow 3H_2 + CO$
$CO + H_2O \rightarrow H_2 + CO_2$
$2NO + 2H_2 \rightarrow N_2 + 2H_2O$ The above-mentioned reactions have been catalyzed recently with high effectiveness by use of Ni=$Al_2O_3$=Ba catalysts formed by coprecipitation and containing usually above 40% nickel with about 3–6% Ba, the coprecipitated solids being properly dried, calcined and then subjected to treatment with hydrogen to reduce the nickel. Although this kind of catalyst is very active, it is more expensive to manufacture and requires more care in handling on account of its tendency to lose activity rapidly when exposed to air or oxygen.

A large amount of accumulated experience has shown that the activity of a catalyst for certain reactions depends upon the components, quantities of these components, and the manner in which these components are put together to form the structure of the catalyst. The activity maintenance also depends on these factors.

The following examples illustrate the advantages of the simultaneous impregnation and reimpregnation procedure of this invention.

EXAMPLE 1.—ORDINARY IMPREGNATION CATALYST 510 grams of activated alumina, calcined 16 hours at 1600° F., was evacuated and impregnated with a solution of 510 grams of nickel hexahydrate in 200 cc. of water. The excess solution was drained, and the alumina was dried at 300° F. and calcined 5 hours at 800° F. It was then impregnated with 500 cc. of solution containing 37.5 grams of barium nitrate, dried and calcined at 800° F. (percent nickel=17; percent Ba=3).

EXAMPLE 2.—SIMULTANEOUS IMPREGNATION AND REIMPREGNATION CATALYST 471 grams of activated alumina calcined at 1600° F. was evacuated and impregnated with a solution of 356 grams of nickel nitrate hexahydrate, 356 grams of aluminum nitrate nonahydrate and 11.1 grams of barium nitrate in 100 cc. of water. The excess solution was drained and the alumina was dried at 300° F. It was then impregnated with the drained solution and dried at 300° F. after draining. The drained solution was used to reimpregnate the dried alumina and the product was again dried and then calcined 3 hours at 800° F. (percent Ni=10; percent Ba=2).

The catalysts prepared as described in Examples 1 and 2 were reduced with hydrogen for one hour at a temperature of 1100° F., and then were evaluated at a lower temperature for their activity in converting hydrocarbons, CO and NO in a simulated internal combustion engine exhaust gas composition by reaction of water and hydrogen in the gas containing 0.073 mol percent isobutane, 0.065% butene 2, 3.1% CO, 9.6% $CO_2$, 1.4% $H_2$, 16.1% $H_2O$, and 0.14% NO. The tests were made at about atmospheric pressure with a gas feed rate of 10,000 volumes (S.T.P.) per volume of catalyst per hour (v./v./hr.). The catalyst formed by simultaneous impregnation and reimpregnation, as described in Example 2, was quite superior as shown in the following table.

TABLE I

|  | Catalyst | | |
| --- | --- | --- | --- |
|  | Example 1 | Example 2 | |
| Temperature °F | 900 | 900 | 730 |
| Percent conversion: |  |  |  |
| Butene | 30 | 100 | 100 |
| Butane | 10 | 97 | 71 |
| CO | 38 | 84 | 94 |
| NO | 57 | 100 | 100 |

The results given in Table I show that simultaneous impregnation of the activated alumina carrier with the salts of nickel, aluminum, and barium followed by drying and reimpregnation with said salts gives a much more active catalyst than is obtained when the alumina support is impregnated by only the nickel and by the barium compounds in the ordinary manner.

The simultaneous impregnation with the compound of aluminum and nickel is thought to be the critical step, and the barium addition can be made subsequently. The reimpregnation procedure is used to increase the amount of nickel above that obtainable by a single impregnation.

The calcination is preferably carried out by heating the nickel and aluminum salt impregnated alumina in air to temperatures in the range of 600° to 1150° F. The reduction with hydrogen is carried out at 600° to 1150° F.

It will be understood that the simultaneous impregnation technique for making nickel-alumina catalysts may be used not only with Ba but with other added promoting or stabilizing compounds such as compounds of copper, manganese, chromium, potassium, or the like, in relatively smaller proportions, e.g., 1 to 10 wt. percent. The catalysts made in accordance with the present invention by simultaneous impregnation and reimpregnation compare favorably with the more expensive, higher nickel-content catalysts, made by coprecipitation of nickel and aluminum compounds, in effecting the reactions of hydrocarbons and carbon monoxide with steam to form mainly a gas product containing $H_2$, $CO_2$ and $H_2O$, or to form mainly $CH_4$, $H_2$ and $CO_2$ depending on the feed space velocity, temperature and pressure.

In the production of Town Gas in which the product gas preferably contains $CH_4$ as the major component, the feed of hydrocarbons, $C_xH_y$, in the $C_2$ to $C_{12}$ range is passed under super atmospheric pressure in the range of 100 to 1000 p.s.i.g. at temperatures in the range of 600° to 925° F. over the catalyst with about 1 to 6 pounds of water per pound of hydrocarbon feed in the form of steam, at a hydrocarbon mass space velocity of about 2 to 5 pounds per pound of catalyst per hour. By increasing the space velocity, i.e., lowering the contact time, the product gas is made to have an increased amount of $H_2$ in proportion to $CH_4$. The product gas will usually contain well below 1 mol percent CO, close to 20 mol percent $CO_2$ and the remainder of about 80+ mol percent of both $H_2$ and $CH_4$ in various ratios depending on the residence time, when the gas composition is analyzed on an $H_2O$ free basis.

In the reactions such as occur in the Town Gas production, the carbon monoxide formed by the water-gas reaction undergoes a water-gas shift reaction and a methanation reaction as shown in the following equations:

$$CO + H_2O \rightarrow CO_2 + H_2$$
$$CO + 3H_2 \rightarrow CH_4 + H_2O$$

The water-gas shift reaction is the faster reaction but the methanation reaction, which is slower, becomes the principal reaction at 700° to 900° F. when the reaction time is adequate for approaching thermodynamic equilibrium. To produce principally hydrogen by reaction of hydrocarbons with steam lower temperatures and higher space velocities are used.

The invention described is claimed as follows:

1. A catalyst for the reaction of hydrocarbons and CO in gaseous phase with steam comprising an adsorbent alumina support impregnated with nickel, aluminum and metal promoter compounds formed by impregnating the alumina simultaneously with an aqueous solution of salts of nickel, aluminum and metal promoter which are thermally decomposable to the oxides, drying the impregnated alumina, reimpregnating said dried alumina, and thereafter drying and calcining the reimpregnated alumina and reducing nickel oxides to nickel in the impregnated alumina.

2. A catalyst as defined in claim 1 impregnated with barium oxide as a promoter.

3. A catalyst as defined in claim 1 wherein the alumina is impregnated with nitrate salts of nickel, aluminum and barium salts, the adsorptive alumina is activated by calcination at temperatures up to about 1600° F., the impregnated alumina is dried and calcined at temperatures in the range of 700° to 950° F. and contains 5 to 25% nickel.

4. In a process of reforming a gaseous mixture of hydrocarbons and steam to form a product containing mainly $H_2$ and $CH_4$, the improvement of contacting the gaseous mixture of hydrocarbon and steam with a catalyst as defined in claim 1.

5. In an exhaust gas purification for removal of hydrocarbons, CO, and nitrous oxide pollutants from an exhaust gas containing hydrocarbons, CO, $CO_2$, $H_2$, $H_2O$, NO, and $N_2$, by contact with an equilibration catalyst, the improvement which comprises contacting said exhaust gas with a catalyst as defined in claim 1.

6. A catalyst defined in claim 1, in which the alumina support is activated to have a surface area of 80 to 300 sq. meters per gram and is reimpregnated after the initial impregnation, drying and calcining to have the catalyst contain 5 to 25 wt. percent of Ni and 5 to 25 wt. percent of alumina added by impregnation, after the catalyst has been subjected to calcining in air at 600° to 1150° F. followed by reduction with hydrogen at 600° to 1150° F. of nickel oxides formed by the calcining.

References Cited

UNITED STATES PATENTS

| | | | |
|---|---|---|---|
| 2,580,806 | 1/1952 | Malina | 252—463 |
| 2,742,437 | 4/1956 | Houdry | 252—466 |
| 3,014,860 | 12/1961 | Douwes et al. | 252—466 |
| 3,119,667 | 1/1964 | McMahon | 23—212 |
| 3,179,488 | 4/1965 | Appell | 252—466 |
| 3,264,228 | 8/1966 | Burbidge | 252—463 |
| 3,320,182 | 5/1967 | Taylor et al. | 252—466 |
| 3,340,011 | 9/1967 | Hoekstra et al. | 252—463 |

DANIEL E. WYMAN, *Primary Examiner.*

PAUL E. KONOPKA, *Assistant Examiner.*

U.S. Cl. X.R.

23—2, 212, 288; 48—197, 213; 252—463, 466, 473